United States Patent [19]

Hanak

[11] Patent Number: 4,713,492
[45] Date of Patent: * Dec. 15, 1987

[54] STOWABLE LARGE AREA SOLAR POWER MODULE

[75] Inventor: Joseph J. Hanak, Birmingham, Mich.

[73] Assignee: Energy Conversion Devices, Inc., Troy, Mich.

[*] Notice: The portion of the term of this patent subsequent to Nov. 27, 2001 has been disclaimed.

[21] Appl. No.: 789,906

[22] Filed: Oct. 21, 1985

[51] Int. Cl.⁴ .............................................. H02N 6/00
[52] U.S. Cl. ...................................... 136/245; 126/426
[58] Field of Search ............... 136/206, 244, 245, 250, 136/251, 261, 291, 292; 126/400, 426; 342/8, 10; 343/880, 881, 882, 915, 916

[56] References Cited

U.S. PATENT DOCUMENTS

| 3,165,751 | 1/1965 | Clark | 342/10 X |
| 3,690,080 | 9/1972 | Dillard | 343/915 X |
| 4,119,965 | 10/1978 | Kaszyk | 342/8 |
| 4,485,264 | 11/1984 | Izu et al. | 136/245 |
| 4,530,739 | 7/1985 | Hanak et al. | 204/4 |
| 4,565,607 | 1/1986 | Hanak et al. | 204/38.1 |

Primary Examiner—Deborah L. Kyle
Assistant Examiner—Brian S. Steinberger
Attorney, Agent, or Firm—Marvin S. Siskind; Richard M. Goldman

[57] ABSTRACT

A large area solar photovoltaic power module comprises a plurality of flexible large area solar panels interconnected by a flexible hinge. The module may thus be folded and subsequently rolled into a compact, stowable cylindrical configuration.

15 Claims, 8 Drawing Figures

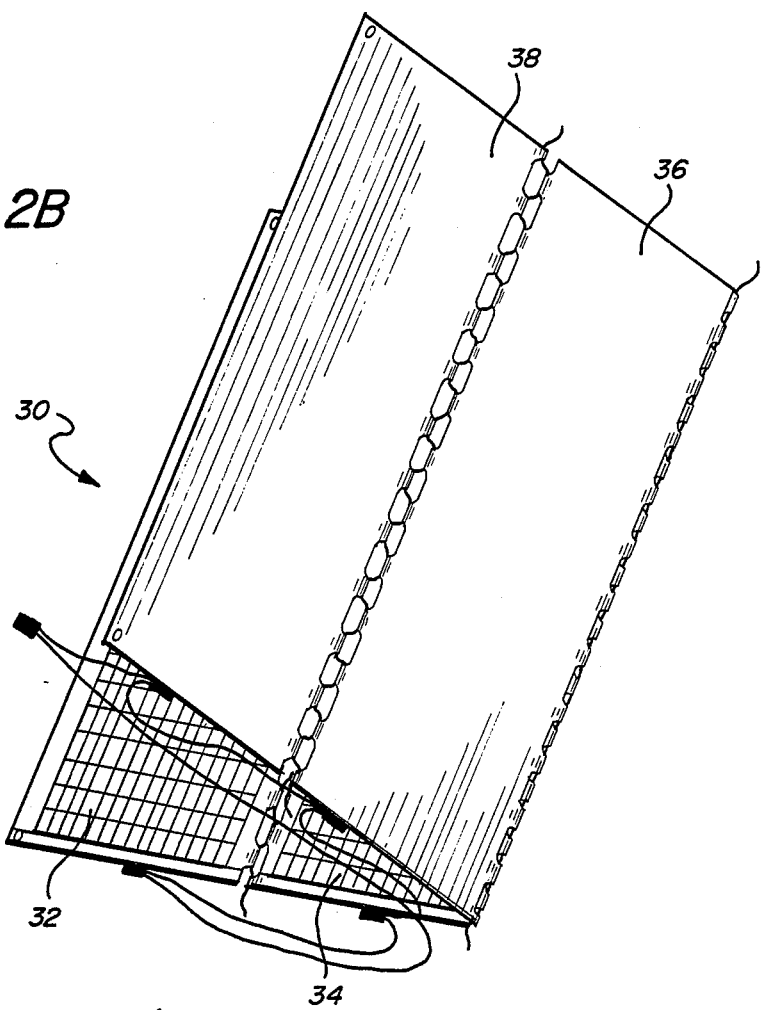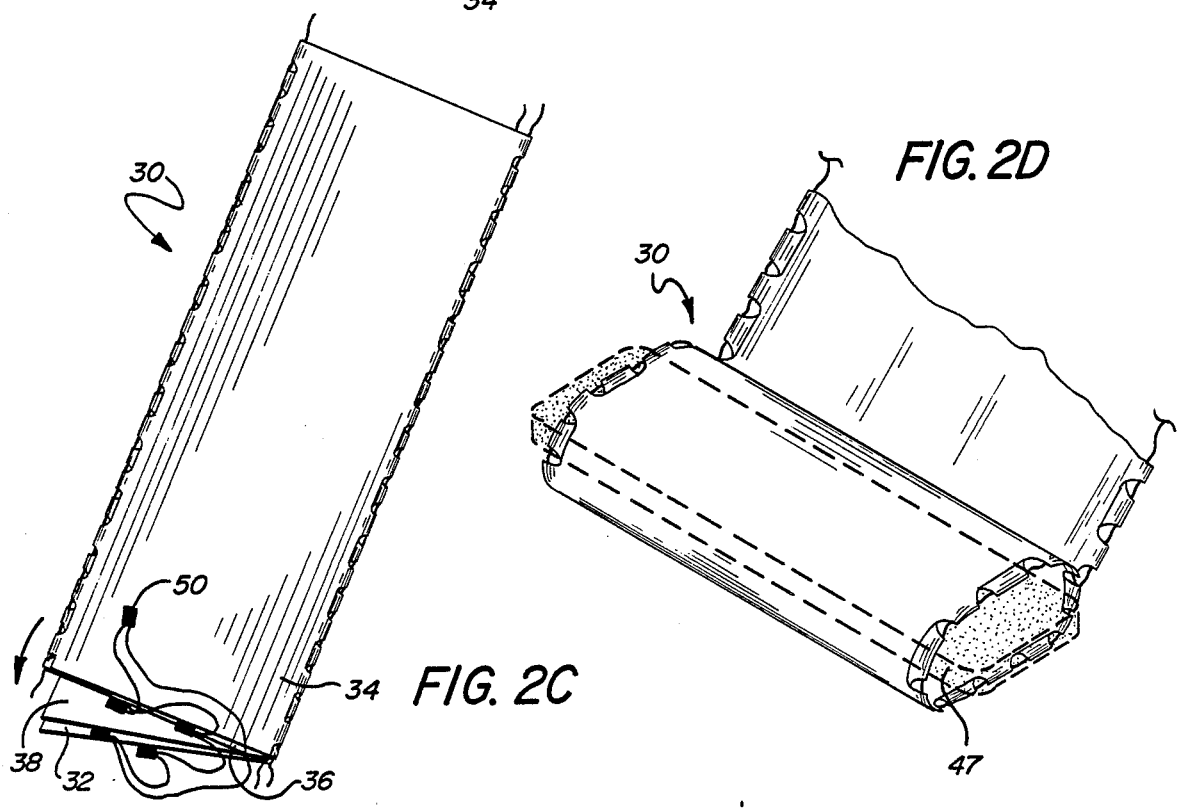

STOWABLE LARGE AREA SOLAR POWER MODULE

FIELD OF THE INVENTION

This invention relates generally to photovoltaic devices and more particularly to relatively large area power generating modules. Most particularly, the invention relates to a large area electrical power generating solar photovoltaic module formed of a flexible, light-weight material, which may be readily compacted for storage and which module may be quickly deployed for use.

BACKGROUND OF THE INVENTION

Because of the increasing worldwide demand for energy, and the consequent depletion of nonrenewable resources, increasingly greater usage is being made of solar energy. Photovoltaic devices are attractive sources of power insofar as they are relatively compact, silent, nonpolluting and consume no expendable natural resources in their operation.

Solar photovoltaic energy sources are particularly attractive in those areas or under those conditions where power-grid supplied electricity is unavailable. Solar photovoltaic power is used in military and aerospace applications, in agricultural applications, in developing nations and by persons engaged in recreational pursuits such as camping, boating, mountain climbing and the like.

Single crystal photovoltaic devices, especially silicon photovoltaic devices have been utilized for some time as sources of electrical power. However, the utility of such devices is limited by problems associated with their manufacture. More particularly, single crystal materials (1) are difficult to produce in sizes substantially larger than several inches in diameter, (2) are relatively thick and heavy; and (3) are expensive and time consuming to fabricate. Consequently, single crystal photovoltaic power modules are limited in use by cost, bulk and fragility; accordingly, there is a need for a source of solar photovoltaic power which is rugged, reliable, readily transportable and low in cost.

Recently, considerable efforts have been made to develop processes for depositing amorphous semiconductor films, each of which can encompass relatively large areas, and which can be doped to form p-type and n-type materials for the production of p-i-n type devices substantially equivalent to those produced by their crystalline counterparts. It is to be noted that the term "amorphous" as used herein, includes all materials or alloys which have long range disorder, although they may have short or intermediate range order or even contain, at times, crystalline inclusions.

It is now possible to prepare by glow discharge or other vapor deposition techniques, thin film amorphous silicon or germanium based alloys in large areas, said alloys possessing acceptable concentrations of localized states in the energy gaps thereof and high quality electronic properties. Suitable techniques for the preparation of such alloys are fully described in U.S. Pat. No. 4,226,898, entitled "Amorphous Semiconductor Equivalent to Crystalline Semiconductors," of Stanford R. Ovshinsky and Arun Madan which issued Oct. 7, 1980 and in U.S. Pat. No. 4,217,374, under the same title, which issued on Aug. 12, 1980, to Stanford R. Ovshinky and Masatsugu Izu, and in U.S. Pat. No. 4,504,518 of Stanford R. Ovshinsky, David D. Allred, Lee Walter and Stephen J. Hudgens entitled "Method of Making Amorphous Semiconductor Alloys and Devices Using Microwave Energy," which issued on Mar. 12, 1985, and in U.S. Pat. No. 4,517,223 under the same title which issued on May 14, 1985 to Stanford R. Ovshinsky, David D. Allred, Lee Walter and Steven J. Hudgens, the disclosures of which are incorporated herein by reference. As disclosed in these patents, it is believed that fluorine introduced into the amorphous semiconductor operates to substantially reduce the density of the localized states therein and facilitates the addition of other alloying materials.

It is of obvious commercial importance to be able to mass produce photovoltaic devices such as solar cells. However, with crystalline cells, mass production was limited to batch processing techniques by the inherent growth requirements of the crystals. Unlike crystalline silicon, amorphous silicon and germanium alloys can be deposited in multiple layers over large area substrates to form solar cells in a high volume, continuous processing system. Such continuous processing systems are disclosed in the following U.S. Pat. Nos. 4,400,409, for A Method of Making P-Doped Silicon Films And Devices Made Therefrom; No. 4,410,588, for Continuous Amorphous Solar Cell Deposition And Isolation System And Method; U.S. Pat. No. 4,547,711, for Continuous Systems For Depositing Amorphous Semiconductor Material; U.S. Pat. No. 4,492,181 for Method And Apparatus For Continuously Producing Tandem Amorphous Photovoltaic Cells; and U.S. Pat. No. 4,485,125 for Method And Apparatus For Continuously Producing Tandem Amorphous Photovoltaic Cells. As disclosed in these patents the disclosures of which are incorporated herein by reference, a substrate may be continuously advanced through a succession of deposition chambers, wherein each chamber is dedicated to the deposition of a specific semiconductor material. In making a solar cell of n-i-p type configuration, the first chamber is dedicated for depositing a n-type amorphous silicon alloy, the second chamber is dedicated for depositing an intrinsic amorphous silicon alloy, and the third chamber is dedicated for depositing a p-type amorphous silicon alloy.

Since each deposited semiconductor alloy, and especially the intrinsic semiconductor alloy, must be of high purity; (1) the deposition environment in the intrinsic deposition chamber is isolated, by specially designed gas gates, from the doping constituents within the other chambers to prevent the diffusion of doping constituents into the intrinsic chamber; (2) the substrate is carefully cleansed prior to initiation of the deposition process to remove contaminants; (3) all of the chambers which combine to form the deposition apparatus are sealed and leak checked to prevent the influx of environmental contaminants; (4) the deposition apparatus is pumped down and flushed with a sweep gas to remove contaminants from the interior walls thereof; and (5) only the purest reaction gases are employed to form the deposited semiconductor materials. In other words, every possible precaution is taken to insure that the sanctity of the vacuum envelope formed by the various chambers of the deposition apparatus remains uncontaminated by impurities, regardless of origin.

The layers of semiconductor material thus deposited in the vacuum envelope of the deposition apparatus may be utilized to form a photovoltaic device including one or more p-i-n cells, one or more n-i-p cells, a Schottky barrier, as well as photodiodes, phototransistors, or the like. Additionally, by making multiple passes through the succession of deposition chambers, or by providing an additional array of deposition chambers, multiple stacked cells of various configurations may be obtained. By the use of a flexible substrate in the deposition process, large area, flexible photovoltaic devices may be fabricated.

The large area semiconductor material thus produced may be used as a single large area photovoltaic cell or may be configured into a variety of smaller area photovoltaic cells as well as modules comprised of arrays of interconnected smaller area devices. For example, as disclosed in U.S. Pat. No. 4,514,579 of Joseph J. Hanak entitled "Large Area Photovoltaic Cell and Method for Producing Same" the disclosure of which is incorporated herein by reference, a large area photovoltaic cell tolerant of defects in or damage to smaller area portions thereof may be produced by interconnecting a plurality of smaller area cells in a mixed series-parallel relationship.

The assignee of the instant invention has also developed techniques for sequentially depositing layers of semiconductor material upon a very thin, flexible substrate material so as to allow for the manufacture of "ultralight" photovoltaic cells and modules manifesting extemely high power to weight ratios. Such techniques are disclosed in U.S. patent application Ser. No. 913,046, now abandoned, a division of U.S. patent application serial No. 696,390 filed Jan. 30, 1985 and entitled "Extremely Lightweight, Flexible Semiconductor Device Arrays and Method of Making Same," the disclosure of which is incorporated herein by reference. Since it is now possible to manufacture lightweight and ultralightweight flexible solar cell power sources, it would be highly advantageous to incorporate such solar cell power sources into modules, which modules have been specifically adapted for ease of portability and rapid deployment.

Heretofore, photovoltaic cells were generally made of single crystal material and accordingly were bulky, brittle and expensive. Even thin film materials presented problems in the fabrication of large area stowable modules insofar as most of said prior art thin film photovoltaic devices were deposited upon glass or rigid metal substrates. However, the present ability to manufacture photovoltaic cells upon lightweight flexible substrates now allows for the manufacture of modules which may be rolled up or otherwise compacted for storage.

While modules configured according to the aforedescribed prior art may be rolled into a cylindrical configuration, the ultimate size of these stowed modules is still limited by the fact that compact folding of the photovoltaic material frequently presents problems. In cases where the material is deposited upon a thin metal substrate, folding is not possible because the substrate itself would become kinked or creased and would ultimately crack. Photovoltaic devices deposited upon ultrathin substrates do allow for some very limited degree of folding. However, if the device is folded around too sharp a radius or if the folded module is rolled too tightly, the substrate will take a permanent crease or the photovoltaic layers may be cracked.

In some instances the length of the rolled up module will not present problems, such as for example when a relatively large amount of space is available for its storage or in those instances where a relatively narrow module is being stored. However, in many instances it would be highly desirable to fold a large area photovoltaic module so as to store it in as compact a container as possible. Additionally, it is highly desirable to be able to quickly and simply deploy the module when power is needed.

The instant invention provides for a large area solar power module which may be readily folded and rolled without causing any damage thereto so as to allow for the very compact storage thereof. Additionally, the module of the instant invention may include a lightweight support member such as a flexible framework for supporting the module and orienting it so as to receive solar radiation. The module may also include a storage container for protecting the power generating module and the support framework when not in use.

According to the principles disclosed herein which will be described in greater detail below, a large area module is formed of a plurality of solar power panels hingedly interconnected so as to allow for the ready folding thereof. While hinges have been known and used in one form or another since time immemorial, most hinges are not flexible enough to allow for rolling of folded material. While relatively flexible hinges formed of polymeric materials such as polypropylene are presently available, such hinges are not suitable for the manufacture of hinged, portable solar power modules since they retain the hinged members in relatively rigid alignment.

Use of such heretofore available hinges in the manufacture of a rollable, foldable solar power module presents a problem of buckling since the stacked, folded photovoltaic panels to the interior of the roll are bending about a smaller radius than are the panels to the exterior of the roll. The differential radii necessitate a slippage of the layers past one another to allow for smooth rolling, and if this slippage is prevented by the presence of a rigid hinge, buckling, tearing or other damage can result.

The instant invention overcomes these problems by providing a large area photovoltaic module comprised of a plurality of large area solar panels interconnected by a hinge which allows for folding of the panels atop one another and also allows for relative planar displacement of adjoining panels so that slippage may be provided for when the module is rolled. In this manner, the large area module of the instant invention may be readily rolled to a fairly small radius for storage and may be rapidly unrolled and unfolded for deployment.

These and other advantages and features of the instant invention will be more apparent from the brief description, the drawings, the detailed description of the drawings and the claims which follow.

BRIEF DESCRIPTION OF THE INVENTION

There is disclosed herein a stowable, deployable large area solar module comprised of a plurality of hingedly interconnected large area solar photovoltaic panels. The hinge means interconnecting the panels is adapted to provide for the panels to be folded in overlying sandwiched relationship while also providing for the sandwiched panels to be helically wound into a stowable, cylindrical configuration. In one embodiment of the instant invention the hinge means comprises a plurality of hinge knuckles associated with at least one edge of each large area panel. Each of the knuckles includes a passage therethrough adapted to receive a pintle. The hinge knuckles of adjacent panels are disposed in a spaced apart, generally coplanar, interdigitating relationship. The flexible pintle is disposed so as to sequentially pass through the interdigitating knuckles of the adjacent panels. The spaced apart knuckles allow for a degree of planar displacement of the adjoining large area panels relative to one another as well as allowing for the panels to be folded in a sandwiched relationship. The flexible pintle allows for the folded panels to be helically wound. In some instances, the hinge knuckles are tapered with the widest portion thereof being adjacent the edge of the large area panel with which they are associated. The flexible pintle may be a generally elongated member formed from a material chosen from the group consisting essentially of cloth, twine, synthetic polymers, rubber, metal and combinations thereof.

The large area module includes means for withdrawing electrical power therefrom, and may further include means for electrically interconnecting individual ones of the large area panels. The interconnecting means may include a pair of terminals associated with each of the panels and adapted for interconnection so as to effect a series, parallel or mixed series-parallel configuration. Each of the large area panels may further include a plurality of electrically interconnected small area photovoltaic cells. In some embodiments of the instant invention, the large area panels are comprised of a plurality of thin, flexible semiconductor layers disposed upon a flexible electrically conductive substrate. The semiconductor layers may be chosen from a group consisting essentially of silicon alloy materials, germanium alloy materials, silicon-germanium alloy materials, cadmium telluride, cadmium selenide, gallium arsenide, copper indium diselenide and combinations thereof. The substrate may be a thin, metallic member or a flexible, polymeric member having an electrically conductive coating upon at least a portion thereof.

The module may further include a lightweight support member adapted to retain the module in an orientation and configuration for efficient solar illumination thereof. The support member may, in some instances, comprise two flexible rod-like members each of a length greater than the longest dimension of the interconnected panels. The module of the instant invention may also include a storage cannister adapted to stow the helically wound, large area panels. In some instances, the lightweight support member may be disassemblable into a plurality of small segments adapted for stowage in the cannister.

The instant invention also includes a method of storing a large area solar photovoltaic module, which method includes the steps of folding the module so as to reduce the magnitude of at least one of the linear dimensions thereof and rolling the folded module into a stowable, cylindrical configuration. The method may further include the step of providing hinge means associated with the module and adapted to allow for the folded portions of the module to slidably move relative to one another when the module is rolled.

BRIEF DESCRIPTION OF THE DRAWINGS

FIG. 2B is a perspective view of a partially folded large area solar module depicting a first step in the storage thereof;

FIG. 2C is a perspective view of a completely folded large area solar module depicting a second step in the storage thereof;

FIG. 2D is a perspective view of a portion of a folded large area solar module being rolled up for the compact storage thereof;

DETAILED DESCRIPTION OF THE DRAWINGS

Figure 1:
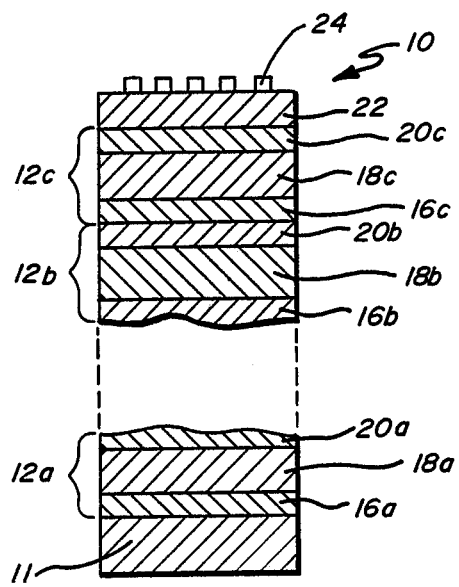
FIG. 1 is a cross-sectional view of a tandem photovoltaic device comprising a plurality of stacked N-I-P solar cells, each cell formed from a triad of layers of semiconductor alloy material.

Referring now to the drawings, where like reference numbers designate like structure, and particularly to FIG. 1, a stacked, tandem, or cascade-type, photovoltaic device, formed of successive n-i-p layers each including an amorphous semiconductor alloy, is shown generally by the reference numeral 10. The large area photovoltaic power module of the present invention may include photovoltaic cells having a similar configuration; however, it is to be understood that the instant invention is not limited to the use of any particular composition or configuration of cell or layers. For example, any other type of thin film solar cells, such as p-i-n devices, p-n devices, Schottky barrier devices or MIS (metal-insulator-semiconductor) type cells formed of silicon alloys, germanium alloys, silicon-germanium alloys, cadmium telluride, cadmium sulfide, cadmium selenide, gallium arsenide copper indium diselenide and the like may also be employed in the fabrication of modules in accord with the principles of the instant invention.

FIG. 1 shows a tandem photovoltaic device 10, which includes a photovoltaic semiconductor body 12 adapted to generate a flow of electrical current in response to the absorption of photons incident thereupon, and consisting of a plurality of n-i-p photovoltaic cells 12a, 12b, and 12c. Below lowermost cell 12a is a flexible substrate 11 which may be a metallic member such as an electrically conductive stainless steel sheet, or a thin metallic foil, or which may be formed from an electrically insulating material such as glass, synthetic polymeric resins and the like, and provided with an electrically conductive coating upon at least a portion thereof.

Although certain applications may require the application of a thin oxide layer and/or a series of base contacts deposited upon the substrate prior to the deposition thereupon of the semiconductor material, for purposes of this application, the term, "substrate" shall also include any elements added thereto by preliminary processing.

As illustrated, each of cells 12a, 12b and 12c includes a semiconductor body containing at least a silicon alloy. Each of the alloy bodies includes an n-type region or layer (16a, 16b and 16c); an intrinsic region or layer (18a, 18b and 18c); and a p-type region or layer (20a, 20b and 20c). As illustrated, cell 12b is an intermediate cell and, as indicated in FIG. 1, additional intermediate cells may be stacked atop the illustrated cells without departing from the spirit or scope of the present invention. Also, although stacked n-i-p cells are illustrated, this invention is equally adapted for single or stacked p-i-n cells, it being understood that the term "n-i-p type cell" as used herein is meant to include any triad of n, i and p semiconductor layers operatively disposed to provide a photoactive region for generating charge carriers in response to the absorption of photon energy.

For each of cells 12a, 12b and 12c, the p-type layers are characterized by low light absorption, high conductivity, layers of preferably microcrystalline, semiconductor alloy material. The intrinsic alloy layers are characterized by an adjusted wavelength threshold for a solar photoresponse, high light absorption, low dark conductivity and high photoconductivity and may include sufficient amounts of a band gap adjusting element or elements to optimize the band gap for the particular cell application. Preferably, the intrinsic layers are band gap adjusted to provide cell 12a with a lowest band gap, cell 12c with the highest band gap, and cell 12b with a band gap between the other two. The n-type layers are characterized by low light absorption, high conductivity, preferably microcrystalline, alloy layers. The thickness of the n-type layers is preferably in the range of about 25 to 500 angstroms. The thickness of the band gap adjusted, amorphous intrinsic alloy layers is preferably between about 2,000 angstroms to 30,000 angstroms. The thickness of the p-type layers is preferably between 25 to 500 angstroms.

The photovoltaic device 10 further includes a layer of transparent electrically conductive material 22, which serves as the top electrode of the photovoltaic device. This layer 22, may be deposited over the semiconductor body 12 in a continuous process, or in a separate environment. In one embodiment, the transparent conductive layer 22 is formed of indium tin oxide although other transparent conductive materials such as zinc oxide, cadmium stannate, tin oxide and indium oxide are known to skilled practitioners and may also be suitably employed to form the layer. The photovoltaic device 10, may also include a bus-grid pattern 24 formed of a highly conductive material to assist in the collection of photogenerated current. The bus-grid pattern is typically formed of a metal such as copper on silver.

Figure 2A:
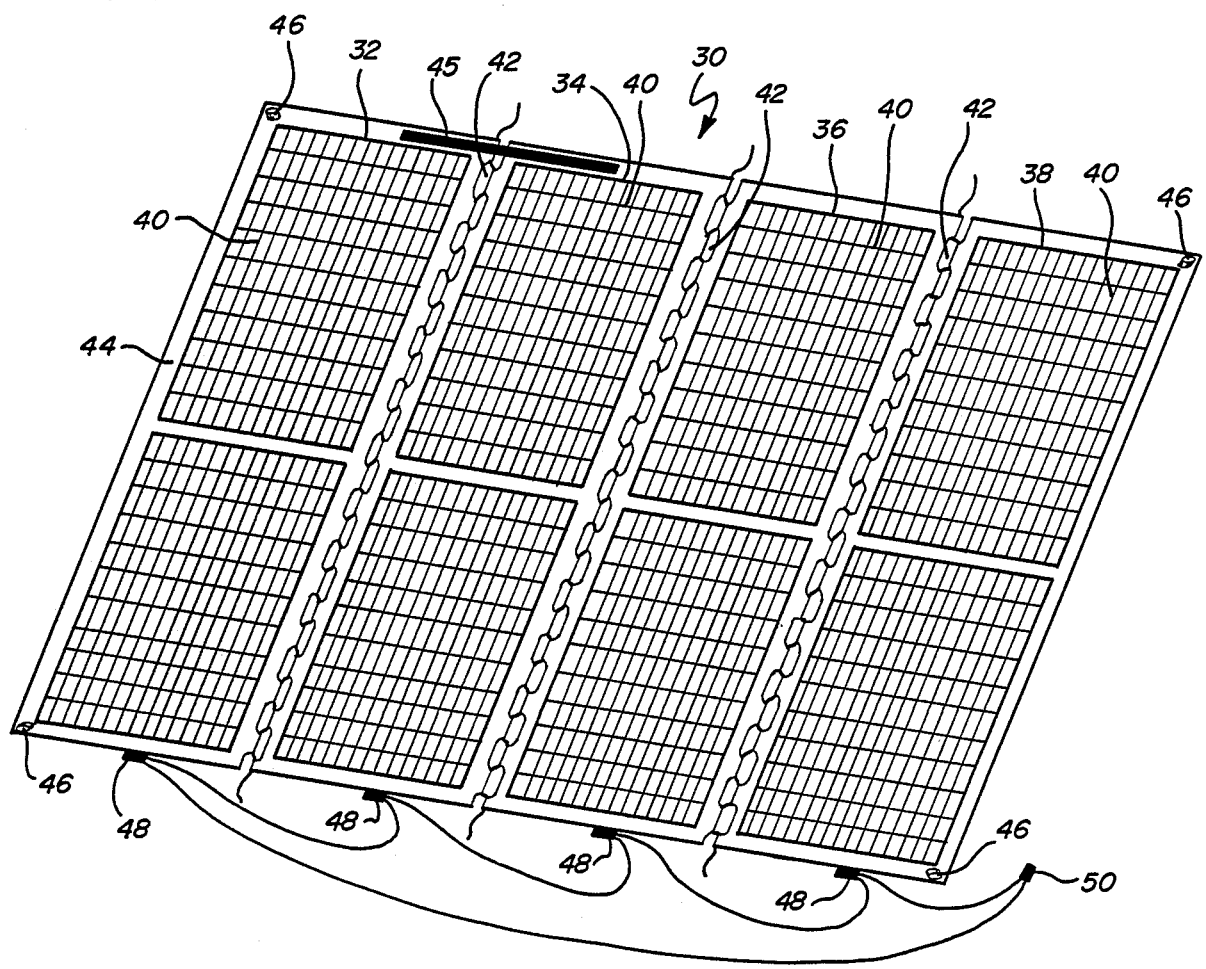
FIG. 2A is a top plan view of a large area solar module structured in accord with the principles of the instant invention and including four mechanically and electrically interconnected large area photovoltaic panels.

Referring now to FIG. 2A, there is shown a plan view of a stowable, deployable large area solar module 30 structured in accord with the principles of the instant invention. The module 30 of FIG. 2A includes four mechanically and electrically interconnected large area photovoltaic panels 32, 34, 36 and 38. In the illustrated embodiment, each of the panels 32-38 are formed of thin film photovoltaic material generally similar to that illustrated with reference to FIG. 1. Each of the large area panels 32-38 is a lightweight, flexible, photovoltaic panel comprised of thin film alloy materials, and each of the large area panels 32-38 includes thereon a bus-grid pattern 40 to aid in the collection of photogenerated current.

In some instances it is preferable to subdivide the photovoltaic material of the large area panels into a plurality of smaller area, electrically interconnected segments so as to provide the panel with a degree of defect and damage tolerance and to optimize the voltage and current output thereof. There are many techniques available to those skilled in the art for effecting such subdivision and interconnection, and all of such large area panel fabrication techniques are contemplated within the scope of the instant invention. It should be noted that the module of the instant invention may be fabricated with any combination of differently or similarly configured, interconnected panels, the only requirement being that the electrical outputs of the panels be electrically compatible.

Each of the large area panels 32-38 will also preferably be encapsulated in a protective coating so as to prevent damage to the thin semiconductor layers. It is preferred that at least the light incident surface of the large area panels 32-38 be protected with a light flexible transparent coating or protective member such as polyesters, fluoropolymers, polyimides and other synthetic organic polymers. For certain deployments, such as outerspace applications, the protective member may preferably be a transparent inorganic material such as silicon dioxide, silicon nitride or silicon oxynitride.

In order to allow for the compact stowing of the module, there is included a flexible hinge 42, mechanically interconnecting adjacent large area panels 32-38. The hinge 42 allows for the panels 32-38 to be folded in overlying sandwiched relationship with one another, additionally since the hinge 42 is flexible it allows for the sandwiched panels to be helically wound into a cylindrical configuration which may be readily stowed. The hinge 42 is formed at least partially of a flexible material. The hinge 42, embodiments of which will be described in greater hereinbelow, may in some instances be formed of a synthetic polymeric material such as polypropelene, polyacetate and the like. In other instances, the hinge may be formed of thin metal, various woven fabrics, cardboard, fiberboard and so forth.

The large area module 30 may also preferably include a reinforcing binding member or tape 44 disposed about the periphery thereof for providing additional strength and rigidity to the module. This binding member 44 may be a fabric or plastic tape or a relatively thin flexible plastic or metallic molding extending about the periphery of the module 30. The reinforcing member 44 may include one or more grommets 46 therein to be utilized for purposes of deploying the module 30 for operation. The grommets 46 will preferably be located at least in the corners of the module 30, although they may in some instances be elsewhere disposed. The module may also include one or more reinforcing or stiffening members 45 disposed upon the periphery of the module 30 and bridging the hinged portion of adjacent panels. This stiffening member 45 has been found advantageous in maintaining integrity of the deployed module 30. The stiffening member 45 may be a rigid or semirigid metallic or polymeric member affixed to the module, by snaps, hooks, loops or by a Velcro backing. In some instances, the Velcro material itself confers sufficient rigidity to the module.

As depicted in FIG. 2A, each of the large area panels 32-38 has associated therewith an electrical terminal 48 electrically communicating with the photovoltaic material of the panel for withdrawing electrical power therefrom. The terminal 48 may comprise a simple pair of wires or may include any one of the many electrical couplers or plugs well known and available to those skilled in the arts. The electrical power produced by each of the large area panels 32-38 may be separately utilized by different appliances or for different purposes; or, as depicted in the Figure, the terminals 48 of the various panels 32-38 may be electrically interconnected to provide a unitary electrical outlet to a single module terminal 50 adapted for interconnection with a power needy appliance or other such load. As depicted in the Figure, the large area panels 32-38 are electrically interconnected in a series relationship. However, it should be immediately apparent that parallel and mixed series - parallel arrangements of panel interconnections may also be established.

Referring now to FIGS. 2B-2D, there is illustrated the manner in which the module 30 of FIG. 2A may be compacted for storage. As shown in FIG. 2B, the module 30 is first folded in half so that panels 36 and 38 overlie panels 32 and 34. In the next step, as depicted in FIG. 2C, the module 30 is again folded in the manner of a road map so that the panels 32-38 are in stacked superposed relationship. The module terminal 50 is placed atop the topmost panel 34, and the module is now ready to be rolled up.

Referring now to FIG. 2D, there is shown the rolling of the folded module 30. Beginning at one of the narrow ends, the folded module is helically wound into a compact form for storage. It should be noted at this point that the terms "rolling" or "helically winding" as used herein shall refer to any process whereby the folded module is compacted so that the stacked panels assume a generally helical form. Rolling shall include both spirally winding the module into a cylindrical configuration as well as folding the stacked panels loosely. As depicted in FIG. 2D, in phantom outline, a lightweight form 47 made of polymeric foam, wood or other such material may be used to enable the module to be rolled into a compact shape having a generally rectangular cross section. Such a rectangularly folded or rolled module is readily adapted for storage in the top or side of a vehicle or in the pocket of a back pack or an article of apparel. While in some instances the module may be simply rolled without encountering any difficulty, in other instances the thickness of the panels and/or the lack of mobility of the hinges 42 in the plane of the panels will cause problems during the rolling.

It should be apparent that when a stacked array of planar panels is helically rolled, those portions of the stacked panels more proximate the center of the roll will be wound around a tighter radius than will those proximate the exterior of the roll. This differential curvature will cause the various stacked panels to be displaced in a planar manner relative to one another; that is to say, the stacked members will slideably move across one another in the direction in which they are being rolled. This effect causes no problem when an unbound stack of loose panels or sheet-like members is being rolled. However, in those instances when the stacked panels are affixed, as for example when the panels of the instant invention are connected by hinges, buckling, bending, or wrinkling of the panels will occur upon rolling. In the practice of the instant invention, this buckling may sometimes be tolerated or accomodated for by loosely rolling the module; however, in those instances where it is desirable to roll the module as compactly as possible for stowage, such buckling would be unacceptable insofar as it would wrinkle or otherwise deform the panel and thereby damage the photovoltaic material.

In accord with another principle of the instant invention, there is provided a hinge for interconnecting the panels of the module, which hinge allows for (1) the folding of the panels into a sandwich relationship and (2) a degree of planar displacement of the stacked panels relative to one another. It should be noted at this point that the term planar displacement is meant to define relative lateral or longitudinal motion of the panels relative to one another in a plane corresponding to the planar surface of the panels. By thus allowing the panels to slidably move relative to one another rolling may be efficiently accomplished without buckling, wrinkling, tearing or otherwise damaging the module.

Figure 3:
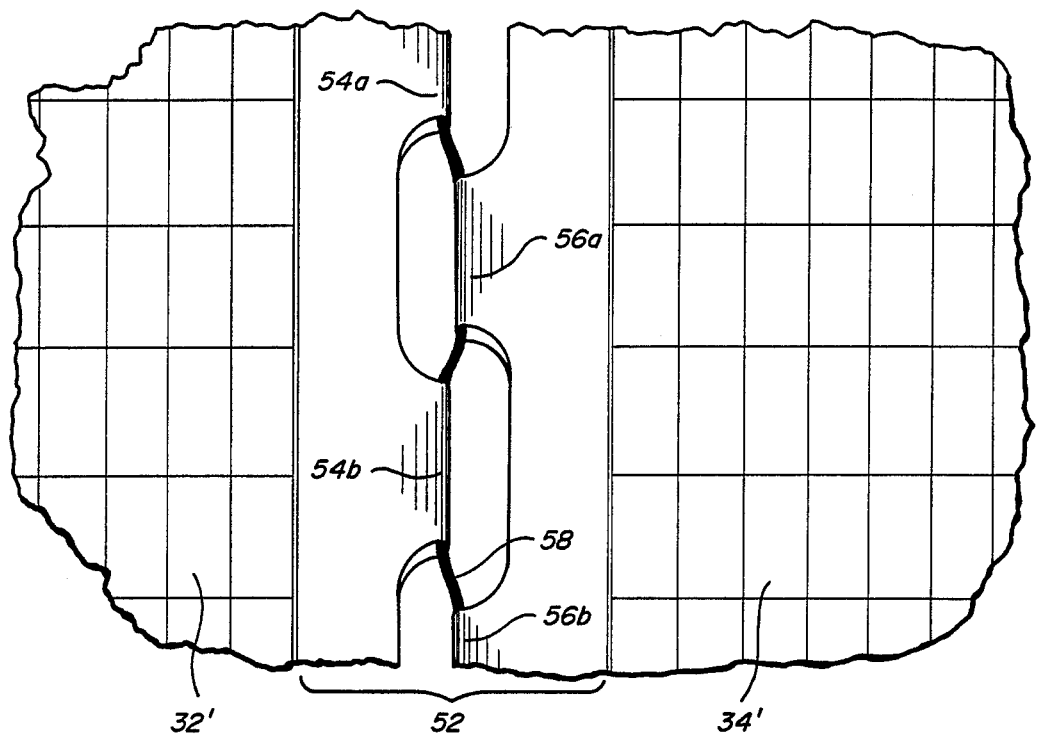
FIG. 3 is an enlarged, fragmentary top plan view of a portion of a large area solar module structured in accord with the principles of the instant invention and depicting in detail the construction of a flexibil hinge adapted to allow for planar displacement of adjoining large area panels.

Refering now to FIG. 3, there is shown an enlarged, detailed depiction of a portion of a flexible hinge structured in accord with the principles of the instant invention as adapted to interconnect two adjacent large area solar panels in a manner which allows for a degree of planar displacement of said panels. As illustrated in the Figure, there are two portions of adjacent large area panels 32', 34' generally similar to those depicted with reference to FIG. 2, jointed by a flexible hinge 52.

The hinge 52 includes two groups of hinge knuckles 54, and 56. The first group of hinge knuckles 54 are associated with the first photovoltaic panel 32' and the second group of hinge knuckles 56 are associated with the second panel 34'. Each of the hinge knuckles is formed of a relatively flexible material such as cloth, thin metal, synthetic polymeric material, rubber and the like and includes a passage therethrough adapted to receive and retain a pintle or hinge pin. It will be noted from the figure that the hinge knuckles are disposed in a spaced apart, generally coplanar interdigitating relationship. That is to say that the hinge knuckles associated with each of the two panels 32' and 34' alternate with one another and each of the hinge knuckles 54, 56 are somewhat smaller than the space formed by the two hinge knuckles on the adjoining panel. For example, the hinge knuckles 56a, 56b of the second panel 34' are spaced far enough apart so that the hinge knuckle 54b of the first panel 32' can fit therebetween without occupying the entirety of that space; this feature is essential for allowing for the relative planar displacement of the two panels 32', 34' when they are rolled.

A flexible pintle 58 is disposed so as to sequentially pass through alternating ones of the hinge knuckles so as to "lace" together the two panels 32', 34'. The pintle 58 first passes through hinge knuckle 54a then through hinge knuckle 56a then back through hinge knuckle 54b and on through hinge knuckle 56b and so forth in sequence. The pintle 58 is an elongated member having a cross sectional dimension substantially smaller than its linear dimension. It may be configured to have a circular, oval, square or flat cross section and is desirably fabricated from a somewhat rigid but flexible material. One material having particular utility is polypropylene fiber of approximately two millimeters diameter; other materials which may be used with equal advantage include by way of illustration: thin flexible metals, helically wound, elongated springs, cloth, leather, rubber, or synthetic polymeric materials.

In some embodiments, the hinge knuckles 54, 56 may be formed of a flexible material adhesively or mechanically affixed to the large area panels 32', 34'. In other instances, the hinge knuckles 54, 56 may be formed from a portion of the encapsulating material used to protect the panels 32', 34' by extending that encapsulant material beyond the edge of the panel, folding it over to the opposite base of the panel so as to define a passageway proximate the fold and cutting the folded over portion so at to define the hinge knuckles. In other instances, the hinge knuckles may comprise circular or cylindrical members formed of metal or other rigid material spacedly mounted on the periphery of the panels. Many other such variations should be readily apparent to one skilled in the art. While the hinge 52 of FIG. 3 was depicted as having hinge knuckles disposed in spaced apart relationship, other designs could similary be employed to allow for planar displacement of the panels. For example, the hinge knuckles may be of a tapering shape, all such variations being within the scope of the instant invention.

Figure 4:
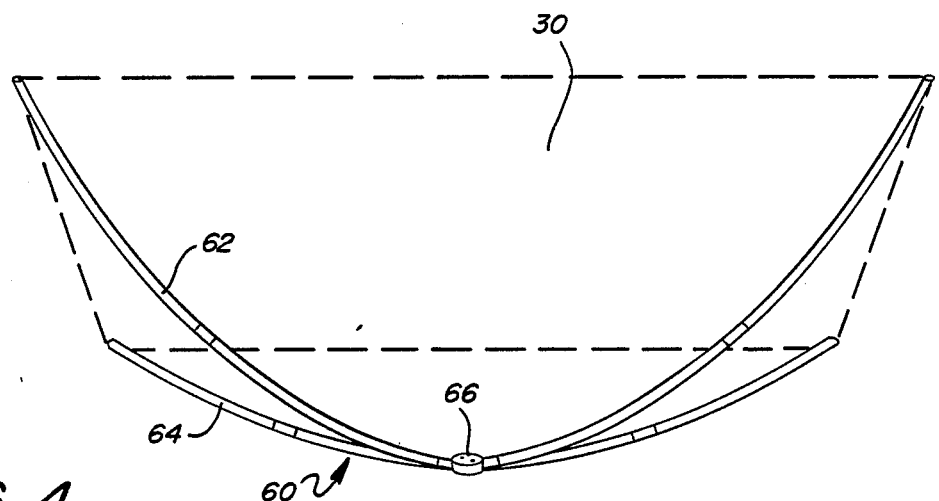
FIG. 4 is a perspective view of a support framework adapted to support the module of the instant invention and orient it for insolation; and, FIG. 5 is a perspective view of a storage cannister as adapted to stow the large area solar module of the instant invention.

Referring now to FIG. 4 there is shown a lightweight support member 60 which may be adapted to deploy a solar power module, such as that illustrated with reference to FIG. 2A, in an orientation and configuration for illumination thereof. The support member 60 of FIG. 4 includes two flexible, rod-like members 62, 64 joined at their centers by a fixture 66. The two rods 62,64 are flexible and preferably formed of: a fiberglass composite, thin metal tubing or limber pieces of wood and are adapted to engage the four corners of a large area solar module (30, indicated here in phantom outline) and maintain that module under a degree of tautness.

Since the two rod-like members 62, 64 are curved, the module 30 may be readily oriented for maximum insolation by disposing the framework 60 on a surface such as the earth and tilting it toward the sun. When the proper orientation is obtained, the framework 60 and module 30 may be immobilized by placing weights upon the rods 62, 64 where they contact the earth or by using light lines and stakes to immobilize the framework 60. It will be noted that the rods 62, 64 and the joint 66 generally resemble the framework of currently employed tents. Accordingly, technology utilized to manufacture and erect such tents may be readily adapted to provide support members for the deployment of large area photovoltaic modules. For example, the rods 62, 64 may be disassemblable in the manner of employed tent frames and may be advantageously manufactured from lightweight metal, polymeric or composite materials presently utilized. In yet another embodiment, the module 30 may be mounted on the outside of, or from one or more walls of at tent or similar structure. Alternatively, the framework 60 may be dispensed with and the module 30 hung on a structure or staked to the ground.

Figure 5:
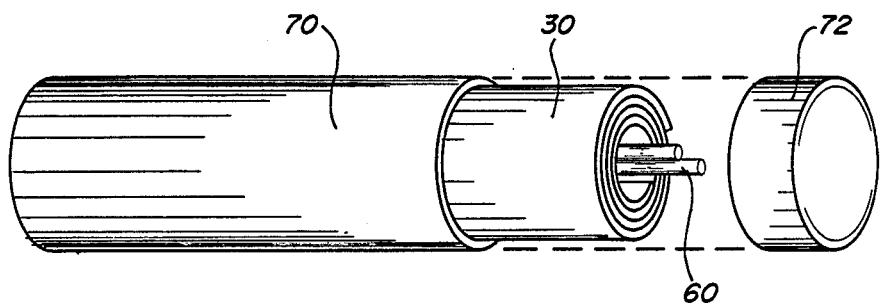

Referring now to FIG. 5 there is shown a storage cannister 70 having retained therein the helically rolled large area photovoltaic power module 30 of the instant invention, illustrating one mode of stowage which the module of the instant invention may be adapted for. The cannister 70 of FIG. 5 is preferably formed of lightweight, durable materials such as metal, plastics, canvas and the like, which are resistant to environmental degradation. The cannister 70 further includes a cap 72 for enclosing the module. The cannister 70 may be further adapted to stow additional components such as the framework 60 of FIG. 4. For example, the framework 60 may be disassembled into a plurality of small portions which may be inserted into the center of the helically wound module 30. Alternatively, the cannister 70 may be provided with an additional storage compartment adapted to retain such ancillary equipment. Obviously, if the module is rolled into a rectangular configuration, a storage container appropriately configured will be employed.

It should be obvious from the foregoing that numerous modifications and variations are present within the scope of the instant invention. For example, while the foregoing discussion is primarily concerned with fabrication of solar photovoltaic modules from amorphous alloy materials, the principles of the instant invention may be employed with equal advantage in conjunction with any other flexible, thin film semiconductor material. The foregoing illustrations and discussion are merely meant to be illustrative of the principles of the instant invention and are not meant to be limitation thereupon. It is the following claims, including all equivalents, which define the scope of the instant invention.

I claim:

1. A stowable, deployable large area solar module comprising: a plurality of discrete, interconnected, flexible, large area solar panels; hinge means operatively disposed on said panels so as to provide for the relative planar displacement of the folded panels of said module when said panels are folded in overlying sandwiched relationship; said hinge means also operatively disposed so as to provide for the folded panels to be rolled into a stowable, substantially cylindrical configuration; said hinge means comprising:

a plurality of hinge knuckles associated with at least one edge of each large area panel, each of said knuckles including a passage therethrough adapted to receive pintle means, the knuckles of adjacent panels disposed in a spaced apart, generally coplanar, interdigitating relationship; and, flexible pintle means disposed so as to sequentially pass through said interdigitating knuckles, whereby said spaced apart knuckles allow for a degree of planar displacement of adjoining large area panels relative to one another, as well as allowing for the folding of said panels in a sandwiched relationship and said flexible pintle means allows for said panels to be rolled into said substantially cylindrical configuration.

2. A module as in claim 1, wherein said hinge knuckles are tapered, with the widest portion thereof being adjacent the edge of the large area panel with which they are associated.

3. A module as in claim 1, wherein said flexible pintle is an elongated member formed from a material chosen from the group consisting essentially of: cloth, twine, synthetic polymers, rubber and metal.

4. A module as in claim 1, further including means for withdrawing electrical power from said module.

5. A module as in claim 2, further including means for electrically interconnecting said large area panels.

6. A module as in claim 1, wherein each of said large area panels includes a plurality of electrically interconnected smaller area photovoltaic cells.

7. A module as in claim 1, wherein each of said large area panels is comprised of a plurality of thin, flexible semiconductor layers disposed upon a flexible, electrically conductive substrate.

8. A module as in claim 1, wherein at least one of said thin, flexible semiconductor layers is chosen from the group consisting essentially of: silicon alloy materials, germanium alloy materials, silicon-germanium alloy materials, cadmium telluride, cadmium selenide, gallium arsenide, and copper indium diselenide.

9. A module as in claim 1, wherein said substrate includes a thin, metallic member.

10. A module as in claim 1, further including a support member comprising two flexible, rod-like members each of a length greater than the longest dimension of said interconnected panels.

11. A module as in claim 10, wherein said rod-like members are disassemblable into a plurality of smaller segments.

12. A module as in claim 1, further including a storage cannister adapted to contain said helically wound, sandwiched large area panels.

13. A module as in claim 12, further including a support member adapted to retain the deployed module in an orientation and configuration for solar illumination thereof; and, wherein said storage cannister is further adapted to store said support member.

14. A method of stowing a large area solar photovoltaic module, said method including the steps of:

providing a plurality of discrete, non-interconnected solar panels;

providing hinge means on said panels, said hinge means hingedly interconnecting said panels;

folding said module panels about said hinge means so as to reduce the magnitude of at least one of the linear dimensions of the module; and, rolling said folded module into a stowable, substantially cylindrical configuration.

15. A method as in claim 14, including the further step of providing hinge means associated with said module and adapted to allow for the relative planar displacement of the folded portions of said module when said module is rolled.

* * * * *